United States Patent
Fu et al.

(10) Patent No.: US 9,684,356 B2
(45) Date of Patent: Jun. 20, 2017

(54) METHOD FOR DETERMINING REMAINING SERVICE TIME OF BATTERY, CLIENT DEVICE AND MOBILE TERMINAL

(71) Applicant: SHELL INTERNET (BEIJING) SECURITY TECHNOLOGY CO., LTD., Beijing (CN)

(72) Inventors: Sheng Fu, Beijing (CN); Ming Xu, Beijing (CN); Xin Liang, Beijing (CN)

(73) Assignee: SHELL INTERNET (BEIJING) SECURITY TECHNOLOGY CO., LTD., Beijing (CN)

( * ) Notice: Subject to any disclaimer, the term of this patent is extended or adjusted under 35 U.S.C. 154(b) by 217 days.

(21) Appl. No.: 14/485,294

(22) Filed: Sep. 12, 2014

(65) Prior Publication Data

US 2015/0077127 A1     Mar. 19, 2015

(30) Foreign Application Priority Data

Sep. 16, 2013 (CN) .......................... 2013 1 0421548

(51) Int. Cl.
| | |
|---|---|
| *H02J 7/00* | (2006.01) |
| *H02J 7/04* | (2006.01) |
| *H02J 7/16* | (2006.01) |
| *G06F 1/32* | (2006.01) |
| *H04L 29/08* | (2006.01) |

(52) U.S. Cl.
CPC .......... *G06F 1/3212* (2013.01); *G06F 1/3287* (2013.01); *H04L 67/26* (2013.01); *H04L 67/36* (2013.01); *Y02B 60/1282* (2013.01); *Y02B 60/1292* (2013.01)

(58) Field of Classification Search
CPC .................................................... H02J 7/0073
USPC ..... 320/132, 133, 149; 429/90, 91; 340/635, 340/636.1, 636.12, 636.19; 702/63, 64
See application file for complete search history.

(56) References Cited

U.S. PATENT DOCUMENTS

| | | | | |
|---|---|---|---|---|
| 7,102,684 | B1 * | 9/2006 | Higuchi ................ | H04N 5/232 320/106 |
| 7,109,875 | B2 * | 9/2006 | Ota ...................... | G08B 25/009 320/132 |
| 7,508,169 | B2 * | 3/2009 | Miskovic .............. | G06F 1/3203 320/114 |
| 7,960,945 | B1 * | 6/2011 | Onorato ............. | G01R 31/3606 320/132 |
| 8,030,939 | B2 * | 10/2011 | Abe .................... | G01R 31/3606 320/133 |

(Continued)

*Primary Examiner* — Richard Isla Rodas
*Assistant Examiner* — Michael DiBenedetto
(74) *Attorney, Agent, or Firm* — Morgan, Lewis & Bockius LLP (57) ABSTRACT

A method for determining remaining battery service time of a mobile terminal includes determining a plurality of battery usage times, wherein each battery usage time corresponds to a respective predefined battery power level interval. Upon receipt of a request to determine the remaining battery service time, the mobile terminal determines a current battery power level of the mobile terminal and compares the current battery power level with at least one of the plurality of battery usage times and their associated predefined battery power level intervals to determine the remaining battery service time. The remaining battery service time is then displayed on the mobile terminal.

21 Claims, 5 Drawing Sheets

(56) References Cited

U.S. PATENT DOCUMENTS

| | | | | |
|---|---|---|---|---|
| 9,000,730 | B2* | 4/2015 | Murawaka | B60L 11/1816 320/109 |
| 2003/0193318 | A1* | 10/2003 | Ozawa | H02J 7/0047 320/132 |
| 2007/0164708 | A1* | 7/2007 | Jiang | H01M 10/425 320/132 |

* cited by examiner

METHOD FOR DETERMINING REMAINING SERVICE TIME OF BATTERY, CLIENT DEVICE AND MOBILE TERMINAL

RELATED APPLICATION

This application claims priority to Chinese Patent Application No. 201310421548.9, "METHOD FOR DETERMINING REMAINING SERVICE TIME OF BATTERY, CLIENT DEVICE AND MOBILE TERMINAL," filed on Sep. 16, 2013, which is hereby incorporated by reference in its entirety.

FIELD OF THE INVENTION

The present application relates to the technical field of mobile terminals, and more particularly, to a method for determining remaining battery service time of a mobile terminal, a client device and a mobile terminal.

BACKGROUND OF THE INVENTION

Mobile terminals, such as smart phones and tablet computers, have become necessities in people's daily life. People often use application software installed in the mobile terminals for different purposes including, e.g., work-related or recreational purposes.

However, the capacity of a battery in a mobile terminal is limited. For many users, estimation of the remaining battery service time of the mobile terminal is important in order to better utilize the resources on the mobile terminal and make the users' life more convenient.

Therefore, how to estimate remaining battery service time of the mobile terminal more accurately is a problem to be solved.

SUMMARY

The above deficiencies and other problems associated with the conventional approach of estimating remaining battery service time of the mobile terminal are reduced or eliminated by the invention disclosed below. In some embodiments, the invention is implemented in a mobile terminal that has one or more processors, memory and one or more modules, programs or sets of instructions stored in the memory for performing multiple functions. Instructions for performing these functions may be included in a computer program product configured for execution by one or more processors and stored in a non-transitory computer readable medium.

One aspect of the invention involves a method for determining remaining battery service time of a mobile terminal performed at the mobile terminal, the mobile terminal having one or more processors and memory storing programs executed by the one or more processors. The method includes: determining a plurality of battery usage times, wherein each battery usage time corresponds to a respective predefined battery power level interval; receiving a request to determine the remaining battery service time; in response to the request: determining a current battery power level of the mobile terminal; determining the remaining battery service time by comparing the current battery power level with at least one of the plurality of battery usage times and their associated predefined battery power level intervals; and generating a display of the remaining battery service time on the mobile terminal.

Another aspect of the invention involves a mobile terminal including one or more processors, memory, and one or more programs stored in the memory and configured for execution by the one or more processors. The one or more program modules include instructions for: determining a plurality of battery usage times, wherein each battery usage time corresponds to a respective predefined battery power level interval; receiving a request to determine the remaining battery service time; in response to the request: determining a current battery power level of the mobile terminal; determining the remaining battery service time by comparing the current battery power level with at least one of the plurality of battery usage times and their associated predefined battery power level intervals; and generating a display of the remaining battery service time on the mobile terminal.

Another aspect of the invention involves a non-transitory computer readable storage medium storing one or more programs for execution by one or more processors of a mobile terminal. The one or more program modules includes instructions for: determining a plurality of battery usage times, wherein each battery usage time corresponds to a respective predefined battery power level interval; receiving a request to determine the remaining battery service time; in response to the request: determining a current battery power level of the mobile terminal; determining the remaining battery service time by comparing the current battery power level with at least one of the plurality of battery usage times and their associated predefined battery power level intervals; and generating a display of the remaining battery service time on the mobile terminal.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

A method and a device for determining remaining battery service time of a mobile terminal as well as a mobile terminal according to embodiments of the present application are described below with reference to the accompanying drawings.

Figure 1:
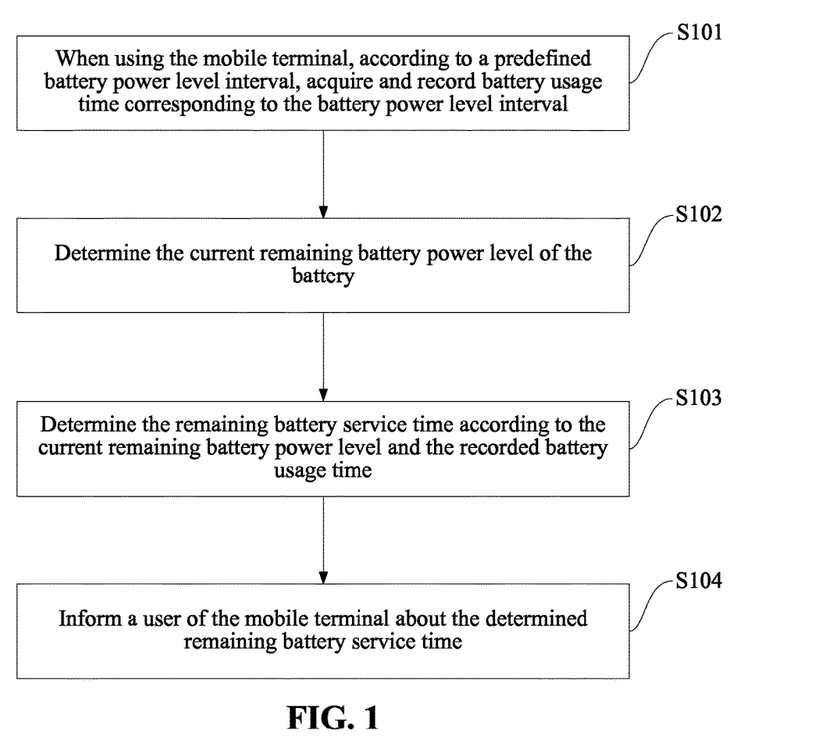
FIG. 1 is a flow chart of a method for determining remaining battery service time of a mobile terminal according to some embodiments of the present application.

FIG. 1 is a flow chart of a method for determining remaining battery service time of a mobile terminal according to some embodiments of the present application. The method is performed by the mobile terminal or a client device installed on the mobile terminal, and the mobile terminal includes, but is not limited to, smart phones, tablet computers, notebook computers, e-books and the like. As shown in FIG. 1, the method includes:

Step S101: When using the mobile terminal, according to a predefined battery power level interval, acquire and record battery usage time corresponding to the battery power level interval.

In this embodiment of the present application, the battery power level of the mobile terminal is divided into several consecutive battery power level intervals from full power to zero power. For example, using percentage as an example, the battery power level can be divided into 10 consecutive battery power level intervals, i.e., 100%-90%, 90%-80%, 80%-70%, 70-%-60%, 60%-50%, 50%-40%, 40%-30%, 30%-20%, 20%-10% and 10%-0% of the full power. Certainly, the present application does not set any limit on how to divide the battery power level intervals, and persons skilled in the art can make an arbitrary and reasonable choice.

It can be understood that, each battery power level interval includes a pair of predetermined battery power levels corresponding to two endpoints, a high-value endpoint and a low-value endpoint. For example, the high-value endpoint of the battery power level interval 100%-90% is 100%, and the low-value endpoint is 90%.

It should be noted that, the process of using the mobile terminal means a normal usage process during which the mobile terminal is in a state of running and power consumption. In this process, a user can actively use the mobile terminal to perform various functions that the mobile terminal can support. Alternatively, the mobile terminal may temporarily enter a sleep mode if the user does not use the mobile terminal for a moment.

In this embodiment of the present application, when using the mobile terminal, according to a predefined battery power level interval, when the battery power level of the mobile terminal is reduced from the high-value endpoint of the battery power level interval to the low-value endpoint, a corresponding battery usage time, i.e., the time period during the battery power level is reduced from the high-value endpoint to the low-value endpoint, is determined and recorded. When using the mobile terminal, since the user may change his or her usage habits, the battery usage time corresponding to the same battery power level interval varies. In this embodiment of the present application, as the battery usage time is determined in a more adaptive manner when using the mobile terminal, the battery's power consumption in the mobile terminal can be more accurately determined and truly reflects the users' habits.

The mobile terminal or a client device can receive, through a system interface, a notification message sent by the operating system of the mobile terminal when the battery power level changes. For example, the message carries a current battery power level, which may be in the form of a battery power level percentage, so that the current battery power level can be known, and measurement can be made on the time period during which the battery power level is reduced from the high-value endpoint of each battery power level interval to the corresponding low-value endpoint. For example, with respect to the battery power level interval 90%-80%, time t1 when the battery power level is 90% and time t2 when the battery power level is reduced to 80% can be obtained through the notification message, so that it can be determined that the time period during which the battery power level is reduced from 90% to 80% is t2-t1.

The mobile terminal, after the battery is fully charged, measures, one by one, the time period during which the battery power level is reduced from the high-value endpoint to the corresponding low-value endpoint for each of the one or more battery power level intervals from full power to zero power. The mobile terminal can also, in the case that the battery is not fully charged, measure the time period as long as a complete battery power level interval is spanned. For example, the power from 84% to 47% does not completely span the battery power level interval 90%-80%, but it completely spans the battery power level intervals 80%-70%, 70%-60%, and 60%-50%, and thus the time period during which the battery power level intervals completely spanned are reduced from high-value endpoints thereof to low-value endpoints can be measured.

Specifically, in this step, with respect to a certain battery power level interval, if a mobile terminal, when using the mobile terminal, measures the time period during which the battery power level is reduced from the high-value endpoint of the battery power level interval to the low-value endpoint for the first time, the measured time can be determined and recorded as the battery usage time corresponding to the battery power level interval. If the time period during which the battery power level is reduced from the high-value endpoint of the battery power level interval to the low-value endpoint has been measured before, in this embodiment of the present application, the currently measured battery usage time will be averaged with the previously measured one to determine an average between the currently measured one and the previously measured ones. The calculated average battery usage time is recorded as the battery usage time corresponding to the battery power level interval. In other words, the battery usage time corresponding to each battery power level interval will be updated accordingly each time there is a new current measurement. The average battery usage time may gradually approach the actual value of the battery usage time of the battery power level interval with the number of measurements increasing. Thus the battery usage time corresponding to each battery power level interval of the mobile terminal can be more truly and accurately obtained, so as to make the remaining battery service time determined more precise.

There are different ways of using the currently measured battery usage time and the historically measured battery usage time to determine a battery usage time for a given battery power level interval. As noted above, there are many factors affecting the accuracy of the battery usage time. For example, the same user may different applications at different times while the mobile terminal is around the same battery power level while different applications consumes the battery power at different rates. Therefore, it is helpful to take into account the applications currently running on the mobile terminal when averaging the currently measured battery usage time and the historically measured battery usage time. For example, a sliding window may be used for averaging the historically measured battery usage time first such that only the most recent measured time data samples (e.g., within the last two weeks) are considered because it is assumed that there is a certain level of continuity of the user's usage habit. In some embodiments, different weights may be given to the currently measured battery usage time and the historically measured battery usage time. For example, more weight may be given to the currently measured battery usage time while less weight to the historically measured battery usage time. In some other embodiments, the battery power management application records not only the battery usage time but also the other usage attributes associated with the mobile terminal (e.g., the number of applications running on the mobile terminal corresponding to the battery power level interval, the length of running time of an individual application, and the power consumption rates associated with different applications). Before the mobile terminal averages the currently measured battery usage time and one or more historically measured battery usage times, it may first compare the usage attributes of the currently measured battery usage time and that of the historically measured battery usage times and assign more weight to historical data samples that have similar usage attributes profile as the current one and less weight to other data samples. This adaptive approach can further improve the accuracy of the remaining battery service time determined according to the present application.

In some embodiments, after the time period during which the battery power level is reduced from the high-value endpoint of a certain battery power level interval to the low-value endpoint is measured, the validity of the measured time is determined first to more truly and accurately obtain the battery usage time corresponding to each battery power level interval of the mobile terminal. When it is determined that the measured time is valid, the time is used for average calculation, or otherwise, the measured time is abandoned, that is, the data is neither recorded nor used for calculating the time average. For instance, if the measured time is excessively long (e.g., the time is twice greater than of the previously recorded battery usage time corresponding to the same battery power level interval) or if the measured time is excessively short (e.g., the time is less than one third of the previously recorded battery usage time corresponding to the same battery power level interval), the measured time is deemed to be invalid data.

In some other embodiments, during the time period during when the battery power level is reduced from the high-value endpoint of a certain battery power level interval to the low-value endpoint, if it is detected that the normal use of the mobile terminal is interrupted by the battery being recharged or the mobile terminal is powered off, the current measurement has to be abandoned because the corresponding time period does not represent the actual battery usage time.

Step S102: Determine a current battery power level.

A notification message sent by the operating system when the power changes can be received through a system interface of the mobile terminal, the message carries a current battery power level, that is, the remaining power of the battery is reflected, and the current battery power level may be a battery power level percentage.

Step S103: Determine the remaining battery service time according to the current battery power level and the previously recorded battery usage time.

In step S101, the battery usage time corresponding to each battery power level interval has been acquired and recorded, and in this step, the remaining battery service time will be determined according to the current battery power level and the battery usage time previously recorded in step S101.

Specifically, this step includes:

1. According to the current battery power level and predefined battery power level intervals, determine a battery power level interval including the current battery power level and zero or more battery power level intervals whose high-value endpoints are less than or equal to the low-value endpoint of the battery power level interval including the current battery power level.

For example, if the predefined battery power level intervals are 10 consecutive battery power level intervals, i.e., 100%-90%, 90%-80%, 80%-70%, 70-%-60%, 60%-50%, 50%-40%, 40%-30%, 30%-20%, 20%-10% and 10%-0%, and the current battery power level of the mobile terminal is 38%, the battery power level interval including the current battery power level includes the battery power level interval 40%-30% where 38% is, and battery power level intervals 30%-20%, 20%-10% and 10%-0% whose high-value endpoints are less than or equal to the low-value endpoint 30% of the battery power level interval 40%-30% where the current battery power level is.

2. Calculate the remaining battery service time according to the current battery power level and the battery usage time corresponding to the battery power level interval including the current battery power level recorded.

Specifically, the remaining battery service time=the service time corresponding to the battery power level interval including the current battery power level*(a ratio of a difference between the current battery power level and the low-value endpoint of the battery power level interval including the current battery power level to the length of the battery power level interval including the current battery power level)+the accumulated service time corresponding to battery power level intervals immediately below the battery power level interval including the current battery power level.

Also take that the current battery power level is 38% as an example:

The remaining battery service time=the battery usage time corresponding to (30%-40%)*(a difference between 38% and 30%)/(a difference between 40% and 30%, that is, the interval length 10%)+the battery usage time corresponding to (20%-30%)+the battery usage time corresponding to (10%-20%)+the battery usage time corresponding to (0-10%).

Step S104: Inform a user of the mobile terminal about the determined remaining battery service time.

Figure 4:
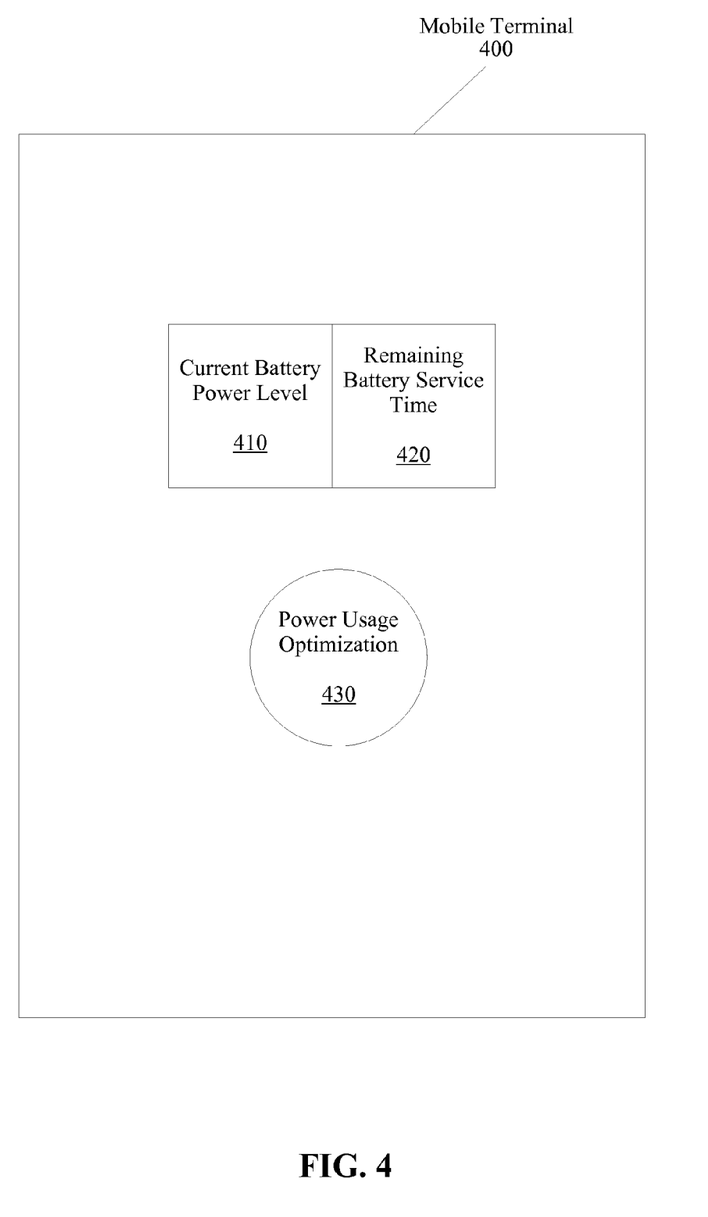
FIG. 4 is a block diagram of a mobile terminal including a display of remaining battery service time according to some embodiments of the present application.

FIG. 4 is a block diagram of a mobile terminal 400 including a display of the current battery power level 410 and the remaining battery service time 420 determined according to the present application. As shown in FIG. 4, the remaining battery service time 420 can be displayed to the user through an interactive interface on the screen of the mobile terminal 400 or an interactive interface of the client device displayed on the screen of the mobile terminal. In some embodiments, a battery power management application running on the mobile terminal is responsible for performing the operations described above in connection with FIG. 1. For example, a user may check the remaining battery service time by clicking an icon corresponding to the battery power management application, which generates a request to the battery power management application for retrieving the information necessary for determining and reporting the current battery power level 410 and the remaining battery service time 420. In some embodiments, the battery power management application runs as a session in the backend of the mobile terminal 400. It may repeatedly update the current battery power level 410 and the remaining battery service time 420 either according to a predefined schedule (e.g., every 30 minutes) or in response to a predefined type of user operations (e.g., when the user starts a new application on the mobile terminal 400 or closes an existing application running on the mobile terminal 400). In some embodiments, the user can optimize the power usage of the mobile terminal 400 by pressing the power usage optimization button 430. For example, this power usage optimization button 430 may not appear on the screen of the mobile terminal 400 until its current battery power level 410 or remaining battery service time 420 is less than a predefined threshold (e.g., 20%). In some embodiments, the mobile terminal 400 may update the predefined threshold based on other attributes associated with the mobile terminal 400. For example, if the mobile terminal 400 is in the airplane mode, the mobile terminal 400 may increase the predefined threshold to 40% because it may take longer time before the mobile terminal 400 is recharged. The power usage optimization may include turning off some of the applications that are either in an idle mode for a predefined time period or consumes too much power or both. For example, if the mobile terminal 400 is in the airplane mode, the GPS application running on the mobile terminal 400 should be turned off to save the battery power.

The method provided in this embodiment of the present application includes, when using the mobile terminal, according to a predefined battery power level interval, acquiring and recording battery usage time corresponding to the battery power level interval, and according to the recorded battery usage time, determining the remaining battery service time. Mobile terminals are different, batteries are different, and users' habits of using a mobile terminal when using the mobile terminal are different. For example, a certain user likes to play a game, so that power consumption of the mobile terminal of the user is faster; thus, power consumption of the battery of each mobile terminal is different. The method provided in this embodiment of the present application includes measuring the time period during which the battery power is reduced from the high-value endpoint of each battery power level interval to the low-value endpoint when using the mobile terminal, which can individually determine the remaining battery service time for the mobile terminal of each user, can estimate the remaining battery service time of the mobile terminal with respect to different habits of each user, and has higher accuracy.

It should be noted that, in one embodiment of the present application, when determining the remaining battery service time, the battery usage time corresponding to a certain battery power level interval has been neither acquired nor recorded, the battery usage time corresponding to the same battery power level interval of the mobile terminal determined by a remote server can be acquired from the remote server, and when it is determined that the remaining battery service time needs to include the battery usage time corresponding to the battery power level interval, the battery usage time acquired from the remote server can be used instead. Then, if, when using the mobile terminal, the time period during which the battery power level is reduced from the high-value endpoint of the battery power level interval to the low-value endpoint is measured, an average between the measured time and the battery usage time acquired from the remote server is calculated, and the average is used as the battery usage time corresponding to the battery power level interval.

Specifically, the remote server collects battery usage time corresponding to different battery power level intervals of different mobile terminals of the same model by other users, and with respect to a certain battery power level interval, calculates an average between all the collected battery usage time and stores the average. When the battery usage time corresponding to one battery power level interval or some battery power level intervals have not been recorded on the mobile terminal, the battery usage time corresponding to the battery power level intervals can be acquired from the remote server for estimating the remaining battery service time of the mobile terminal.

It should be noted that, the estimated battery power level of some mobile terminals is inaccurate, and the mobile terminals may also be powered off before the power reaches 0%. In this embodiment of the present application, when configuring battery power level intervals, the power 10%-0% may be divided into more fine-grained battery power level intervals, for example, it is divided into 10 battery power level intervals, i.e., 10%-9%, 9%-8%, . . . , and 1%-0%, so as to make the measured and recorded battery usage time corresponding to the battery power level intervals more accurate.

Moreover, when measuring the battery usage time of each battery power level interval (i.e., the time period during which it is reduced from its high-value endpoint to its low-value endpoint), if it is found that the battery usage time is excessively short, users may be prompted with information indicating that the power consumption is excessively fast and a power-saving mode is recommended. Moreover, the method according to this embodiment of the present application can also save power for the users by cleaning the memory of the mobile terminal or switching to a power-saving mode.

One battery power level interval in the predefined battery power level intervals is taken as an example below to describe in detail the process of acquiring and recording battery usage time corresponding to the battery power level interval in step S101. The battery power level interval is recorded as a first battery power level interval, endpoints of the first battery power level interval include a high-value endpoint and a low-value endpoint. For example, if 100%-90% is taken as the first battery power level interval, the high-value endpoint is 100%, and the low-value endpoint is 90%. It can be understood that the first battery power level interval may be any battery power level interval in the predefined battery power level intervals.

With respect to the first battery power level interval, this step specifically includes:

1. When using the mobile terminal, according to a predefined first battery power level interval, measure the time period during which the battery power level is reduced from the high-value endpoint thereof to the low-value endpoint thereof.

For example, the time period during which the battery is reduced from the power of 100% to the power of 90% is measured. When using the mobile terminal, time t1 when the battery power is 100% is recorded, next, when the battery power is reduced to 90%, time t2 now is recorded, and then it is measured that the time period during which the battery power is reduced from 100% to 90% is a difference between t2 and t1.

2. According to the measured time, determine battery usage time corresponding to the first battery power level interval.

Specifically, it includes: according to the measured time, calculating an average between the measured time and historically measured time period during which the battery power level is reduced from the high-value endpoint of the first battery power level interval to the low-value endpoint, so as to determine the average as the battery usage time corresponding to the first battery power level interval.

3. Record the determined battery usage time corresponding to the first battery power level interval.

It can be understood that, when using the mobile terminal, the mobile terminal may go through multiple charging and power consumption processes, that is to say, the battery power is repeatedly reduced from the high-value endpoint of the first battery power level interval to the low-value endpoint, so, in this embodiment of the present application, when using the mobile terminal, the above steps 1-3 are substantially performed repeatedly. When using the mobile terminal, each time the battery power level is reduced from the high-value endpoint of the first battery power level interval to the low-value endpoint, steps 1-3 are performed once. If steps 1-3 are performed for the first time, in step 2, the time measured in step 1 can be determined as the battery usage time corresponding to the first battery power level interval, and in step 3, the time is recorded. If steps 1-3 are not performed for the first time, in step 2, an average between the time measured when step 1 is currently performed and the time measured when step 1 is historically performed is calculated, that is, the average is determined as the battery usage time corresponding to the first battery power level interval, and in step 3, the battery usage time is recorded.

In one embodiment of the present application, the historically measured time periods during which the battery power level is reduced from the high-value endpoint of the first battery power level interval to the low-value endpoint can all be recorded, and in step 2, the average calculation can be performed according to the currently measured time and the historically measured time, so as to obtain the battery usage time corresponding to the first battery power level interval.

In another embodiment of the present application, it is optional to record all the historically measured time periods during which the battery power level is reduced from the high-value endpoint of the first battery power level interval to the low-value endpoint. Instead, when recording the battery usage time corresponding to the first battery power level interval, record the quantity of battery usage time data samples for determining the battery usage time, that is, record the quantity of battery usage time data samples involved in the average calculation.

In this way, in step S2, an average C between the measured time and the historically measured time periods during which the battery power level is reduced from the high-value endpoint to the low-value endpoint can be calculated according to the currently measured time and the most recently recorded battery usage time corresponding to the first battery power level interval, specifically according to the currently measured time t, the last recorded battery usage time A corresponding to the first battery power level interval and the quantity N of time data for determining A based on average calculation, so as to obtain the battery usage time C corresponding to the first battery power level interval, where $C=(t+A*N)/(N+1)$. Then, in step S3, record C, and record the quantity M of battery usage time data samples for determining C based on average calculation, where $M=N+1$. It can be understood that, C has replaced A to serve as the last recorded battery usage time corresponding to the first battery power level interval. Optionally, in step S3, A can be directly updated with the currently determined battery usage time C, so that C replaces A to serve as the last recorded battery usage time corresponding to the first battery power level interval. In the subsequent step, if there is no new record, C will serve as the battery usage time corresponding to the first battery power level interval, for calculating the remaining battery service time.

In one embodiment of the present application, when determining the remaining battery service time, a record of the battery usage time corresponding to the first battery power level interval may not exist yet. In this case, the battery usage time corresponding to the first battery power level interval of the mobile terminal determined by a remote server is acquired from the remote server and used for determining the remaining battery service time. Then, if, in step 1, the time period during which the battery power level is reduced from the high-value endpoint of the battery power level interval to the low-value endpoint has been measured, in step 2, according to the measured time, an average between the measured time and the battery usage time acquired from the remote server is calculated as the battery usage time corresponding to the first battery power level interval for determining the remaining battery service time.

To ensure that calculation of the remaining battery service time is more accurate, the method according to this embodiment of the present application can screen the time period during which the battery power is reduced from the high-value endpoint of the first battery power level interval to the low-value endpoint and determine its validity to prevent the measured time from being excessively long or excessively short. For example, if it is determined that the measured time is valid, the battery usage time corresponding to the first battery power level interval is calculated according to the measured time. If it is determined that the measured time is invalid time data, the measured data is abandoned and not used in subsequent determination of the battery usage time corresponding to the first battery power level interval. Specifically, determining whether the measured time is valid may include checking at least one of the following conditions:

Determine whether a difference between the measured time and the last recorded battery usage time corresponding to the first battery power level interval is greater than a first predefined value, and if true, determine that the measured time is invalid. For instance, the first predefined value may be 30 minutes.

Determine whether a difference between the last recorded battery usage time corresponding to the first battery power level interval and the measured time is greater than a second predefined value, and if true, determine that the measured time is invalid.

Determine whether a ratio of the measured time to the last recorded battery usage time corresponding to the first battery power level interval is greater than a third predefined value, and if true, determine that the measured time is invalid. The third predefined value is, for example, 2.

Determine whether the ratio of the measured time to the last recorded battery usage time corresponding to the first battery power level interval is less than a fourth predefined value, and if true, determine that the measured time is invalid. The fourth predefined value is, for example, ⅓.

It can be understood that, the last recorded battery usage time corresponding to the first battery power level interval is the battery usage time corresponding to the first battery power level interval currently used for calculating the remaining battery service time. Persons skilled in the art can arbitrarily select the first predefined value, the second predefined value, the third predefined value and the fourth predefined value, to which the present application makes no limitations.

Besides, to ensure that calculation of the remaining battery service time is more accurate, optionally, the current measurement will be abandoned and measurement will be performed again next time the battery power is reduced from the high-value endpoint to the low-value endpoint if the battery is being charged or the mobile terminal is powered off when measuring the time period during which the battery power level is reduced from the high-value endpoint of the first battery power level interval to the low-value endpoint.

Figure 2:
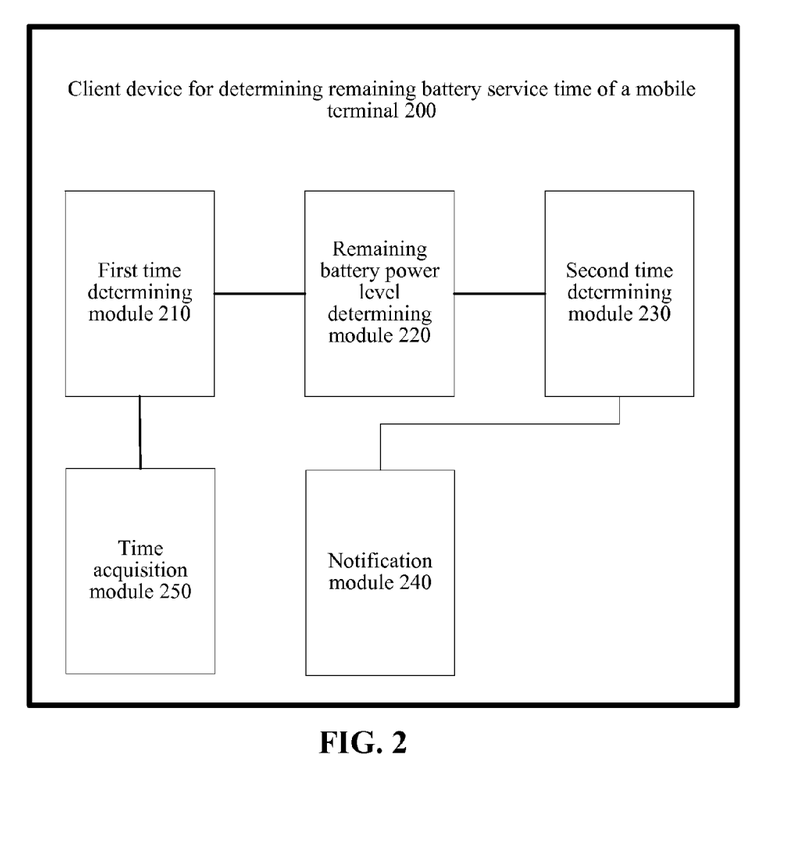
FIG. 2 is a block diagram of a client device for determining remaining battery service time of a mobile terminal according to some embodiments of the present application.

FIG. 2 is a block diagram of a client device for determining remaining battery service time of a mobile terminal according to some embodiments of the present application. The client device is installed on the mobile terminal. As shown in FIG. 2, the client device 200 for determining remaining battery service time of a mobile terminal according to some embodiments of the present application includes: a first time determining module 210, a current battery power level determining module 220, a second time determining module 230, and a notification module 240.

Specifically, the first time determining module 210 is used for, when using the mobile terminal, according to a predefined battery power level interval, acquiring and recording battery usage time corresponding to the battery power level interval.

The current battery power level determining module 220 is used for determining the current battery power level.

The second time determining module 230 is used for determining the remaining battery service time according to the current battery power level and the recorded battery usage time.

The notification module 240 informs a user about the remaining battery service time determined by the second time determining module 230.

One battery power level interval is taken as an example below to describe in detail the first time determining module 210, the battery power level interval is recorded as a first battery power level interval, and endpoints of the first battery power level interval include a high-value endpoint and a low-value endpoint. For example, if 100%-90% is taken as the first battery power level interval, the high-value endpoint is 100%, and the low-value endpoint is 90%.

With respect to the first battery power level interval, the first time determining module 210, when using the mobile terminal, according to a predefined first battery power level interval, measures time period during which the battery power level is reduced from the high-value endpoint to the low-value endpoint, for example, measures the time period during which the battery is reduced from the power of 100% to the power of 90%; and according to the measured time, calculates an average between the measured time and historically measured time period during which the battery power level is reduced from the high-value endpoint to the low-value endpoint, so as to determine the average as the battery usage time corresponding to the first battery power level interval, and records the determined battery usage time corresponding to the first battery power level interval.

The first time determining module 210 specifically calculates an average between the measured time and the historically measured time period during which the battery power level is reduced from the high-value endpoint to the low-value endpoint so as to determine the average as the battery usage time corresponding to the first battery power level interval. In this case, the first time determining module 210 can update and record the last recorded battery usage time corresponding to the first battery power level interval as the determined battery usage time corresponding to the first battery power level interval; therefore, it is only necessary to record the battery usage time determined each time, to save storage resources.

Further, in one embodiment of the present application, as shown in FIG. 2, the client device according to this embodiment of the present application may further include a time acquisition module 250, which acquires from a remote server the battery usage time corresponding to the first battery power level interval of the mobile terminal determined by the remote server before the first time determining module 210, when using the mobile terminal, according to a predefined first battery power level interval, measures the time period during which the battery power level is reduced from the high-value endpoint to the low-value endpoint. In some embodiments, the remote server has a database hosting the battery usage time corresponding to different battery power level intervals (including the first battery power level interval) measured and reported by other mobile terminals of the same or different types.

Thus, the first time determining module 210, according to the measured time, the battery usage time acquired by the time acquisition module 250 from the remote server, and optionally the last recorded battery usage time corresponding to the first battery power level interval calculates an average between the measured time and the historically measured time period during which the battery power level is reduced from the high-value endpoint to the low-value endpoint.

In combination with illustration in FIG. 2, in order to ensure that calculation of the remaining battery service time is more accurate, the first time determining module 210 of the client device 200 according to this embodiment of the present application can screen the battery usage time corresponding to each battery power level interval measured each time.

For example, after measuring the time period during which the battery power level is reduced from the high-value endpoint to the low-value endpoint, the first time determining module 210, before calculating the battery usage time corresponding to the first battery power level interval according to the measured time, determines whether the measured time is valid and abandons the measured time if the measured time is deemed to be invalid. If otherwise, the first time determining module 210 calculates the battery usage time corresponding to the first battery power level interval according to the measured time.

Specifically, the first time determining module 210 determines whether a difference between the measured time and the last recorded battery usage time corresponding to the first battery power level interval is greater than a first predefined value, and if true, determines that the measured time is invalid. The first predefined value, for example, is, but is not limited to, 30 minutes. The first time determining module 210 can also determine whether a difference between the last recorded battery usage time corresponding to the first battery power level interval and the measured time is greater than a second predefined value, and if true, determines that the measured time is invalid.

The first time determining module 210 can also determine whether a ratio of the measured time to the last recorded battery usage time corresponding to the first battery power level interval is within a predefined range. For example, if the ratio is greater than a third predefined value, the first time determining module 210 determines that the measured time is invalid. The third predefined value is, for example, 2. If the ratio is less than a fourth predefined value, the first time determining module 210 determines that the measured time is invalid. The fourth predefined value is, for example, ⅓.

Further, in one embodiment of the present application, if the battery is being charged or the mobile terminal is powered off during the process in which the battery power has been reduced from the high-value endpoint but has not been reduced to the low-value endpoint, the first time determining module 210 abandons the current measurement, and measures the time period during which the battery power level is reduced from the high-value endpoint to the low-value endpoint according to the predefined first battery power level interval next time the battery is reduced from the high-value endpoint to the low-value endpoint.

In other words, each time it is determined that the battery is charged in the process that the battery power has been reduced from the high-value endpoint but has not been reduced to the low-value endpoint, the currently obtained time is abandoned. Each time it is determined that the mobile terminal is powered off or in a power-off state in the process that the battery power has been reduced from the high-value endpoint but has not been reduced to the low-value endpoint, the currently obtained time is abandoned.

That is to say, when measuring the battery usage time in each battery power level interval, the current data is abandoned if there is a charging behavior. If, when measuring the battery usage time in each battery power level interval, the current data is abandoned if the measurement software is of or the user powers off the mobile terminal. If it is determined that the current battery usage time for a certain battery power level interval is excessively long, for example, it is twice greater than the average battery usage time in the battery power level interval, the current data is abandoned. If it is determined that the current battery usage time in a certain battery power level interval is excessively short, for example, it is less than 1/3 of the average battery usage time in the battery power level interval, the current data is abandoned. So, the remaining battery service time of the mobile terminal can be calculated according to the current battery power level percentage of the mobile communication device and the user's usage habit.

The second time determining module 230 determines the remaining battery service time according to the current battery power level and the recorded battery usage time. Specifically, it includes: according to the current battery power level and predefined battery power level intervals, determining a battery power level interval including the current battery power level and battery power level intervals immediate below the battery power level interval including the current battery power level, whose high-value endpoints are less than or equal to the low-value endpoint of the battery power level interval including the current battery power level; and calculating the remaining battery service time according to the current battery power level and the service time corresponding to the battery power level interval including the current battery power level recorded, where: the remaining battery service time=the battery service time corresponding to the battery power level interval including the current battery power level*(a ratio of a difference between the current battery power level and the low-value endpoint of the battery power level interval including the current battery power level to the length of the battery power level interval including the current battery power level)+the accumulated service time corresponding to battery power level intervals immediately below the battery power level interval including the current battery power level.

For example, if the current battery power level percentage is 38%, the available time (the remaining battery service time)=average service time of (30%-40%)*0.8+average service time of (20%-30%)+average service time of (10%-20%)+average service time of (0-10%).

In one embodiment of the present application, after the remaining battery service time is obtained, the remaining battery service time (i.e., the available time) can be displayed to the user through a software interface of the mobile terminal.

The client device for determining remaining battery service time of a mobile terminal according to this embodiment of the present application, when using the mobile terminal, according to a predefined battery power level interval, acquires and records battery usage time corresponding to the battery power level intervals, and according to the recorded battery usage time, determines the remaining battery service time. Mobile terminals are different, batteries are different, and users' habits of using a mobile terminal are different; thus, power consumption of the battery of each mobile terminal is different. The client device provided in this embodiment of the present application, in view of differences between different mobile terminals, different batteries and different users' habits, measures the time period during which the battery power level is reduced from its high-value endpoint to its low-value endpoint when using the mobile terminal of each battery power level interval, which thus can more truly and accurately obtain the battery usage time corresponding to the battery power level interval of the mobile terminal, so as to make the determined remaining battery service time more precise.

Figure 3:
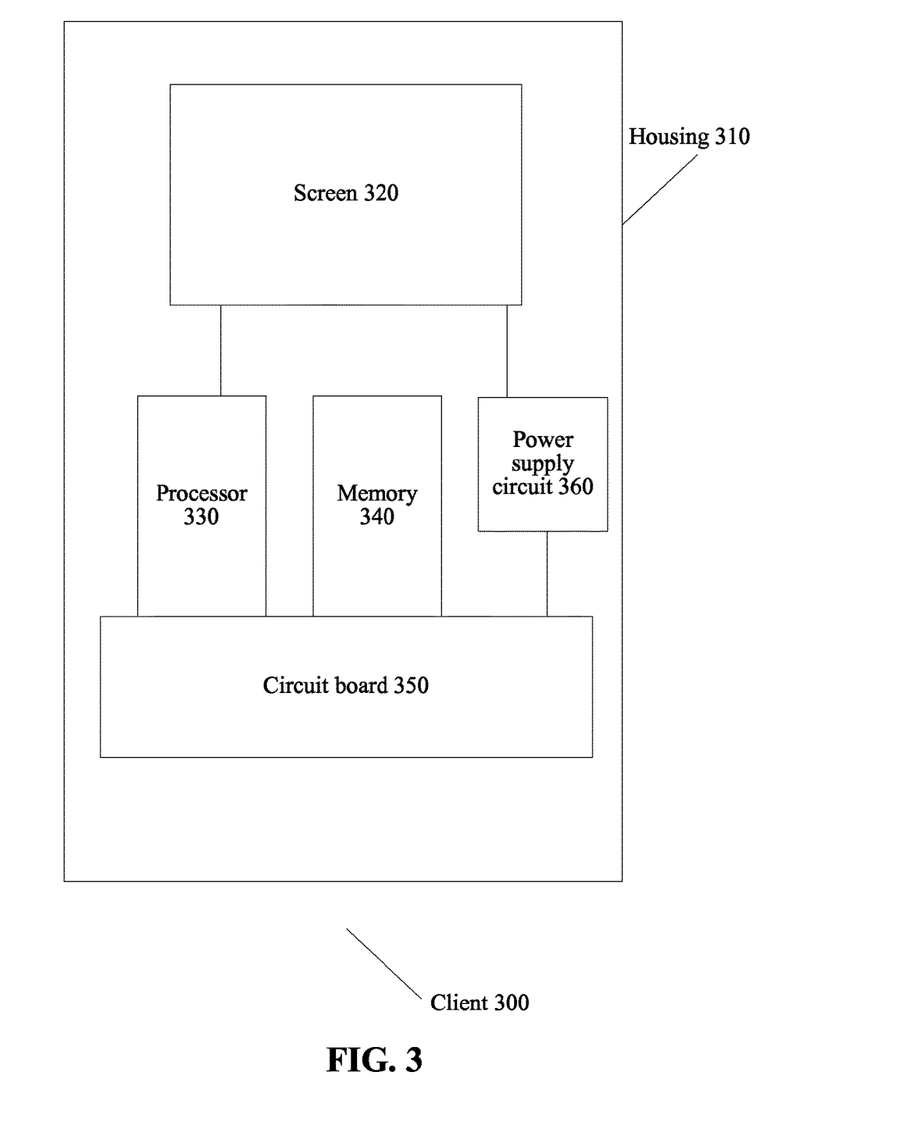
FIG. 3 is a block diagram of a mobile terminal according to some embodiments of the present application.

FIG. 3 is a block diagram of a mobile terminal according to some embodiments of the present application. As shown in FIG. 3, the mobile terminal 300 according to some embodiments of the present application includes: a housing 310, a screen 320, a processor 330, a memory 340, a circuit board 350 and a power supply circuit 360. The mobile terminal 300 is, but is not limited to, smart phones, tablet computers, e-books and the like.

The screen 320 is disposed on the housing 310, the circuit board 350 is disposed inside a space encircled by the housing 310, and the processor 330 and the memory 340 are disposed on the circuit board 350; the power supply circuit 360 is used for supplying power for each circuit or device of the mobile terminal 300; the processor 330 is used for processing data, and is specifically used for: when using the mobile terminal, according to a predefined battery power level interval, acquiring and recording battery usage time corresponding to the battery power level intervals; determining the current battery power level; determining the remaining battery service time according to the current battery power level and the recorded battery usage time; and informing a user of the mobile terminal about the determined remaining battery service time.

The battery power level, for example, is expressed in percentage, and the predefined battery power level interval may include multiple consecutive battery power level intervals, for example, 10 consecutive battery power level intervals, i.e., 100%-90%, 90%-80%, 80%-70%, 70-%-60%, 60%-50%, 50%-40%, 40%-30%, 30%-20%, 20%-10% and 10%-0%. The mobile terminal is, but is not limited to, smart phones, tablet computers, e-books and the like. Certainly, if 90%-80% is taken as a first battery power level interval, the high-value endpoint is 90%, and the low-value endpoint is 80%; the rest can be deduced by analogy.

Specifically, one battery power level interval is taken as an example below to describe in detail the process of calculating the remaining battery service time in the battery power level interval, the battery power level interval is recorded as a first battery power level interval, and endpoints of the first battery power level interval include a high-value endpoint and a low-value endpoint. For example, if 100%-

90% is taken as the first battery power level interval, the high-value endpoint is 100%, and the low-value endpoint is 90%.

The processor 330 is used to:

1. When using the mobile terminal, according to a predefined first battery power level interval, measure the time period during which the battery power level is reduced from the high-value endpoint to the low-value endpoint, for example, measure the time period during which the battery is reduced from the power of 100% to the power of 90%;

2. According to the measured time, calculate an average between the measured time and the historically measured time period during which the battery power level is reduced from the high-value endpoint to the low-value endpoint, so as to determine the average as the battery usage time corresponding to the first battery power level interval, where the operation specifically includes: calculating an average between the measured time and the historically measured time period during which the battery power level is reduced from the high-value endpoint to the low-value endpoint so as to determine the average as the battery usage time corresponding to the first battery power level interval; and 3. Record the determined battery usage time corresponding to the first battery power level interval, where the operation specifically includes: updating and recording the last recorded battery usage time corresponding to the first battery power level interval as the determined battery usage time corresponding to the first battery power level interval.

For example, with respect to a mobile terminal (i.e., a mobile communication device, briefly referred to as device) used by each user, a notification message sent by an operating system when the power changes can be received through a system interface of the mobile terminal, and the message carries a current battery power level, that is, a battery power level percentage (which reflects the remaining power of the battery). Then, when using the mobile terminal, measurement is made on the battery usage time sustained each time the power is reduced by a predefined percentage (for example, each time power of a battery power level interval is reduced from the battery power), for example, the battery usage time of the device from 100%-90%, such as 265 minutes, 90%-80%, and until 10%-0.

In this way, with respect to the mobile terminal of each user, each discharge can be recorded once; in one embodiment of the present application, the device can be fully charged and then record, for example, the interval-by-interval measurements from 10 battery power level intervals from 100% to 0%; even if the device is not fully charged, measurement can be made as long as a complete battery power level interval is spanned. For example, if the current battery power level percentage of the battery is 84%, the current battery power level percentage of the battery is reduced to 47% after the battery is used for a period of time. In this case, data of 90%-80% is incomplete, but data of 80%-70%, data of 70%-60% and data of 60%-50% are all complete. Thus, measurement can be made on the battery usage time in the battery power level interval of 80%-70%, 70%-60%, and 60%-50%, so as to obtain the remaining battery usage time for each battery power level interval.

In this way, after multiple records, the average battery usage time of each battery power level interval can be obtained through average calculation. That is, the average battery usage time in the battery power level interval is obtained, and the average battery usage time may gradually approach a true value with increase of the number of records. That is to say, the average service time of the power corresponding to each battery power level interval changes according to the repeated measured time samples.

When a current battery power level percentage of the battery in the mobile terminal is reduced from a maximum value of a certain battery power level interval to a minimum value, the timestamp at which the current battery power level percentage of the battery is the maximum value of the battery power level interval is recorded as the start time t1. Next, when the current battery power level percentage of the battery is reduced to the minimum value of the battery power level interval, the corresponding timestamp is recorded as the end time t2. A difference between t2 and t1 is taken as the current usage time of the battery power when the remaining battery power level percentage is reduced from the maximum value of the interval to the minimum value.

In one embodiment of the present application, the processor 330 acquires from a remote server the battery usage time corresponding to the first battery power level interval of the mobile terminal determined by the remote server if the mobile terminal has not made any measurement about the time period during which the battery power level is reduced from the high-value endpoint to the low-value endpoint according to a predefined first battery power level interval.

Thus, the processor 330 calculates an average between the measured time and the historically measured time period during which the battery power level is reduced from the high-value endpoint to the low-value endpoint using the measured time, the historically measured time period during which the battery power level is reduced from the high-value endpoint to the low-value endpoint, and the battery usage time acquired from the remote server.

That is to say, when the mobile terminal of a certain user has no historical data (that is, the battery usage time corresponding to each battery power level interval), an average between the battery usage time corresponding to each battery power level interval of other mobile terminals (which should be of the same model as the above user's mobile terminal because different models have greatly different battery usage time) collected by the remote server is used as a calculation base number, and the value is stored on the remote server, so that the remaining battery service time of the mobile terminal is estimated according to the battery usage time corresponding to the battery power level intervals acquired from the remote server.

To ensure that calculation of the remaining battery service time is more accurate, the mobile terminal according to this embodiment of the present application, before making measurements on the battery usage time corresponding to each battery power level interval, can screen the time period during which the battery power level is reduced from the high-value endpoint to the low-value endpoint of the battery power level interval.

For example, after measuring the time period during which the battery power level is reduced from the high-value endpoint to the low-value endpoint, and before calculating the battery usage time corresponding to the first battery power level interval according to the measured time, the processor 330 determines whether the measured time is valid; if it determines that the measured time is invalid, the measured data is abandoned and not used in subsequent calculation of the remaining battery service time. If it determines that the measured time is valid, the battery usage time corresponding to the first battery power level interval is calculated according to the measured time.

Specifically, the processor 330 determining whether the measured time is valid includes:

Determining whether a difference between the measured time and last recorded battery usage time corresponding to the first battery power level interval is greater than a first predefined value, and if yes, determining that the measured time is invalid, where the first predefined value, for example, is, but is not limited to, 30 minutes;

Determining whether a difference between the last recorded battery usage time corresponding to the first battery power level interval and the measured time is greater than a second predefined value, and if yes, determining that the measured time is invalid;

Determining whether a ratio of the measured time to the last recorded battery usage time corresponding to the first battery power level interval is greater than a third predefined value, and if yes, determining that the measured time is invalid, where the third predefined value is, for example, 2; or Determining whether the ratio of the measured time to the last recorded battery usage time corresponding to the first battery power level interval is less than a fourth predefined value, and if yes, determining that the measured time is invalid, where the fourth predefined value is, for example, 1/3.

In one embodiment of the present application, the processor 330 is used to:

if the battery is being charged or the mobile terminal is powered off in the process that the battery power has been reduced from the high-value endpoint but has not been reduced to the low-value endpoint, abandon the current measurement, and measure the time period during which the battery power level is reduced from the high-value endpoint to the low-value endpoint according to the predefined first battery power level interval next time the battery is reduced from the high-value endpoint to the low-value endpoint.

The processor 330 determines the remaining battery service time according to the current battery power level and the recorded battery usage time. Specifically, the processor 330 is used to:

1. According to the current battery power level and predefined battery power level intervals, determine a battery power level interval including the current battery power level and battery power level intervals immediately below the battery power level interval including the current battery power level, whose high-value endpoints are less than or equal to the low-value endpoint of the battery power level interval including the current battery power level;

2. calculate the remaining battery service time according to the current battery power level and the service time corresponding to the battery power level interval including the current battery power level recorded, where the remaining battery service time=the service time corresponding to the battery power level interval including the current battery power level*(a ratio of a difference between the current battery power level and the low-value endpoint of the battery power level interval including the current battery power level to the length of the battery power level interval including the current battery power level)+the accumulated service time corresponding to battery power level intervals immediately below the battery power level interval including the current battery power level.

For example, if the current battery power level percentage is 38%, the available time (the remaining battery service time)=average service time of (30%-40%)*0.8+average service time of (20%-30%)+average service time of (10%-20%)+average service time of (0-10%).

Further, after the remaining battery service time is obtained, the remaining battery service time can be displayed to the user through a software interface of the mobile terminal.

The mobile terminal according to this embodiment of the present application, when using the mobile terminal, according to a predefined battery power level interval, acquires and records battery usage time corresponding to the battery power level interval, and according to the recorded battery usage time, determines the remaining battery service time. Mobile terminals are different, batteries are different, and users' habits of using a mobile terminal when using the mobile terminal are different; thus, power consumption of the battery of each mobile terminal is different. The mobile terminal provided in this embodiment of the present application measures the time period during which the battery power level is reduced from its high-value endpoint to its low-value endpoint when using the mobile terminal, which thus can more truly and accurately obtain the battery usage time corresponding to each battery power level interval of the mobile terminal, so as to make the determined remaining battery service time more precise.

Figure 5:
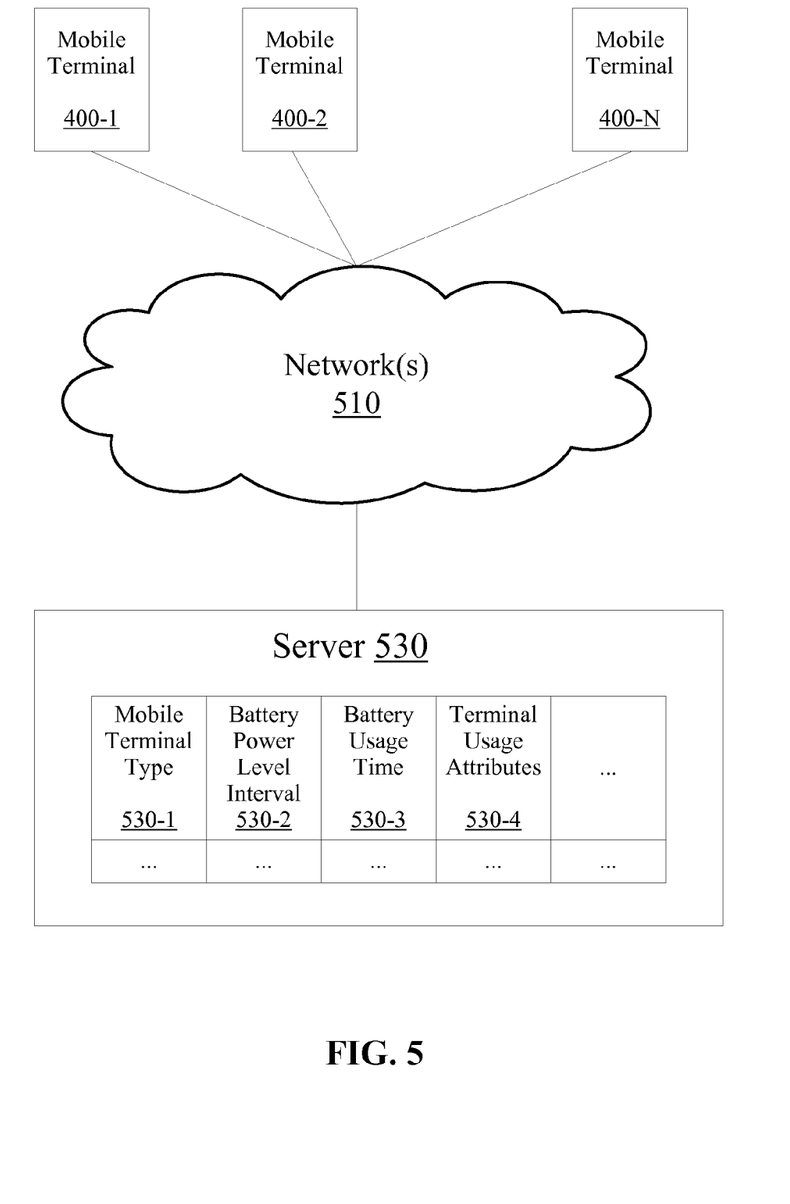
FIG. 5 is a block diagram of a network environment including one or more mobile terminals and a server according to some embodiments of the present application.

FIG. 5 is a block diagram of a network environment including one or more mobile terminals and a server according to some embodiments of the present application. As shown in the figure, this network environment includes one or more mobile terminals 400-1 to 400-N and a remote server 530 coupled to the mobile terminals through networks 510 (which could be wireless or wired or a combination of both). As noted above, a mobile terminal that just installs the battery power management application may have not accumulated enough data samples for charactering the user's usage behavior in order to predict the remaining battery service time for the mobile terminal. In some embodiments, the battery power management applications installed on different mobile terminals (400-1, 400-2, . . . , 400-N) are configured to collect their measured battery usage times corresponding to respective battery power level intervals and submit such data to the server 530 according to a predefined schedule. Assuming that the server 530 has the hardware information of the mobile terminals (e.g., a mobile terminal's model number and battery capacity) when the mobile terminals install the battery power management application, the server 530 may categorize the measured battery usage times associated with different types of mobile terminals as shown in FIG. 5. In some embodiments, the server 530 aggregates the measured battery usage times associated the same type of mobile terminals and use it as an approximate to the battery usage time of a mobile terminal of the same type that just installs the battery power management and does not have its own measurement yet. In some other embodiments, a mobile terminal may still use the data (530-1 to 530-4) stored in the server 530 to average with its own measurements if its own measurements have significant fluctuation. As noted above, different weighting schemes may be applied to the currently measured battery usage time and the historically measured battery usage time. These weighting schemes may be applied to the currently measured battery usage time, the historically measured battery usage time, and the battery usage time provided by the server 530 in a similar manner.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for determining remaining battery service time of a mobile terminal, comprising:
   at the mobile terminal having one or more processors and memory storing programs executed by the one or more processors,
      dividing a battery power of the mobile terminal into a plurality of predefined battery power level intervals, a respective predefined battery power level interval of the plurality of predefined battery power level intervals including a high battery power level and a low battery power level;
      determining a plurality of battery usage times corresponding to the plurality of predefined battery power level intervals respectively, wherein a respective battery usage time corresponds to a time period during which a battery power level of the mobile terminal reduces from the high battery power level to the low battery power level of a corresponding predefined battery power level interval, wherein a respective battery usage time is determined based on a plurality of historical battery usage times associated with the corresponding predefined battery power level interval;
      receiving a request to determine the remaining battery service time;
      in response to the request:
         determining a current battery power level of the mobile terminal;
         determining the remaining battery service time by comparing the current battery power level with at least one of the plurality of predefined battery power level intervals to identify one or more battery usage times and their associated predefined battery power level intervals, wherein the remaining battery service time is determined by summing the identified one or more battery usage times;
         generating a display of the remaining battery service time on the mobile terminal; and
         in accordance with a user selection of a power usage optimization option generated based on the remaining battery service time, switching the mobile terminal to a power-saving mode.

2. The method of claim 1, wherein the respective battery usage time for the mobile terminal between the high battery power level and the low battery power level of a corresponding predefined battery power level interval is determined by:
   recording a first timestamp corresponding to the mobile terminal at the high battery power level and a second timestamp corresponding to the mobile terminal at the low battery power level, respectively;
   determining a first battery usage time sample by differentiating the first timestamp with the second timestamp;
   in accordance with a determination that the first battery usage time sample satisfies one or more predefined conditions:
   identifying a second battery usage time between the high battery power level and the low battery power level, wherein the second battery usage time and the first battery usage time belong to the plurality of historical battery usage times associated with the corresponding predefined battery power level interval; and
   determining the battery usage time by updating the second battery usage time with the first battery usage time sample.

3. The method of claim 2, wherein the second battery usage time is an average of one or more past battery usage time samples between the high battery power level and the low battery power level collected at the mobile terminal prior to the first battery usage time and updating the second battery usage time with the first battery usage time sample is to average the second battery usage time and the first battery usage time sample.

4. The method of claim 2, wherein the second battery usage time is an average of one or more past battery usage time samples between the high battery power level and the low battery power level retrieved from a remote server and updating the second battery usage time with the first battery usage time sample is to average the second battery usage time and the first battery usage time sample.

5. The method of claim 2, wherein the one or more predefined conditions further include at least one of:
   determining whether an absolute difference between the first battery usage time sample and a last battery usage time sample between the high battery power level and the low battery power level is less than a first predefined value; and
   determining whether a ratio between the first battery usage time sample and the last battery usage time sample between the high battery power level and the low battery power level is within a second predefined range.

6. The method of claim 2, wherein the first battery usage time sample is deemed to be invalid if there is a charge or shutdown of the mobile terminal between the first timestamp and the second timestamp.

7. The method of claim 1, wherein determining the remaining battery service time further includes:
   identifying one or more predefined battery power level intervals from the plurality of predefined battery power level intervals, a respective identified predefined battery power interval including or below the current battery power level;
   accumulating the battery usage times for the predefined battery power level intervals below the current battery power level;
   determining a partial battery usage time for the predefined battery power level interval including the current battery power level based on a predefined proportional relationship; and
   adding the partial battery usage time to the accumulated battery usage times as the remaining battery service time of the mobile terminal.

8. A mobile terminal, comprising:
   one or more processors;
   memory; and
   one or more programs stored in the memory and configured for execution by the one or more processors, the one or more programs including instructions for:
      dividing a battery power of the mobile terminal into a plurality of predefined battery power level intervals, a respective predefined battery power level interval of the plurality of predefined battery power level intervals including a high battery power level and a low battery power level;
      determining a plurality of battery usage times corresponding to the plurality of predefined battery power level intervals respectively, wherein a respective battery usage time corresponds to a time period during which a battery power level of the mobile terminal reduces from the high battery power level to the low battery power level of a corresponding a predefined battery power level interval, wherein a respective battery usage time is determined based on a plurality of historical battery usage times associated with the corresponding predefined battery power level interval;
      receiving a request to determine the remaining battery service time;
      in response to the request:
         determining a current battery power level of the mobile terminal;
         determining the remaining battery service time by comparing the current battery power level with at least one of the plurality of predefined battery power level intervals to identify one or more battery usage times and their associated predefined battery power level intervals, wherein the remaining battery service time is determined by summing the identified one or more battery usage times;
         generating a display of the remaining battery service time on the mobile terminal; and
         in accordance with a user selection of a power usage optimization option generated based on the remaining battery service time, switching the mobile terminal to a power-saving mode.

9. The mobile terminal of claim 8, wherein the instruction for determining a battery usage time for the mobile terminal between the high battery power level and the low battery power level of a corresponding predefined battery power level interval further includes instructions for:
   recording a first timestamp corresponding to the mobile terminal at the high battery power level and a second timestamp corresponding to the mobile terminal at the low battery power level, respectively;
   determining a first battery usage time sample by differentiating the first timestamp with the second timestamp;
   in accordance with a determination that the first battery usage time sample satisfies one or more predefined conditions:
      identifying a second battery usage time between the high battery power level and the low battery power level, wherein the second battery usage time and the first battery usage time belong to the plurality of historical battery usage times associated with the corresponding predefined battery power level interval; and
      determining the battery usage time by updating the second battery usage time with the first battery usage time sample.

10. The mobile terminal of claim 9, wherein the second battery usage time is an average of one or more past battery usage time samples between the high battery power level and the low battery power level collected at the mobile terminal prior to the first battery usage time and the second battery usage time is updated with the first battery usage time sample by averaging the second battery usage time and the first battery usage time sample.

11. The mobile terminal of claim 9, wherein the second battery usage time is an average of one or more past battery usage time samples between the high battery power level and the low battery power level retrieved from a remote server and the second battery usage time is updated with the first battery usage time sample by averaging the second battery usage time and the first battery usage time sample.

12. The mobile terminal of claim 9, wherein the one or more predefined conditions further include at least one of:
   determining whether an absolute difference between the first battery usage time sample and a last battery usage time sample between the high battery power level and the low battery power level is less than a first predefined value; and
   determining whether a ratio between the first battery usage time sample and the last battery usage time sample between the high battery power level and the low battery power level is within a second predefined range.

13. The mobile terminal of claim 9, wherein the first battery usage time sample is deemed to be invalid if there is a charge or shutdown of the mobile terminal between the first timestamp and the second timestamp.

14. The mobile terminal of claim 8, wherein the instruction for determining the remaining battery service time further includes instructions for:
- identifying one or more predefined battery power level intervals from the plurality of predefined battery power level intervals, a respective identified predefined battery power interval including or below the current battery power level;
- accumulating the battery usage times for the predefined battery power level intervals below the current battery power level;
- determining a partial battery usage time for the predefined battery power level interval including the current battery power level based on a predefined proportional relationship; and
- adding the partial battery usage time to the accumulated battery usage times as the remaining battery service time of the mobile terminal.

15. A non-transitory computer readable storage medium, storing one or more programs for execution by one or more processors of a mobile terminal, the one or more programs including instructions for the processor to:
- divide a battery power of the mobile terminal into a plurality of predefined battery power level intervals, a respective predefined battery power level interval of the plurality of predefined battery power level intervals including a high battery power level and a low battery power level;
- determine a plurality of battery usage times corresponding to the plurality of predefined battery power level intervals respectively, wherein a respective battery usage time corresponds to a time period during which a battery power level of the mobile terminal reduces from the high battery power level to the low battery power level of a corresponding a predefined battery power level interval, wherein a respective battery usage time is determined based on a plurality of historical battery usage times associated with the corresponding predefined battery power level interval;
- receive a request to determine the remaining battery service time; in response to the request:
- determine a current battery power level of the mobile terminal; determining the remaining battery service time by comparing the current battery power level with at least one of the plurality of predefined battery power level intervals to identify one or more battery usage times and their associated predefined battery power level intervals, wherein the remaining battery service time is determined by summing the identified one or more battery usage times;
- generate a display of the remaining battery service time on the mobile terminal; and
- optimize a power usage of the mobile terminal in accordance with a user selection of a power usage optimization option generated based on the remaining battery service time, switching the mobile terminal to a power-saving mode.

16. The non-transitory computer readable storage medium of claim 15, wherein the instruction for determining a battery usage time for the mobile terminal between the high battery power level and the low battery power level of a corresponding predefined battery power level interval further includes instructions for:
- recording a first timestamp corresponding to the mobile terminal at the high battery power level and a second timestamp corresponding to the mobile terminal at the low battery power level, respectively;
- determining a first battery usage time sample by differentiating the first timestamp with the second timestamp;
- in accordance with a determination that the first battery usage time sample satisfies one or more predefined conditions:
  - identifying a second battery usage time between the high battery power level and the low battery power level, wherein the second battery usage time and the first battery usage time belong to the plurality of historical battery usage times associated with the corresponding predefined battery power level interval; and
  - determining the battery usage time by updating the second battery usage time with the first battery usage time sample.

17. The non-transitory computer readable storage medium of claim 16, wherein the second battery usage time is an average of one or more past battery usage time samples between the high battery power level and the low battery power level collected at the mobile terminal prior to the first battery usage time and the second battery usage time is updated with the first battery usage time sample by averaging the second battery usage time and the first battery usage time sample.

18. The non-transitory computer readable storage medium of claim 16, wherein the second battery usage time is an average of one or more past battery usage time samples between the high battery power level and the low battery power level retrieved from a remote server and the second battery usage time is updated with the first battery usage time sample by averaging the second battery usage time and the first battery usage time sample.

19. The non-transitory computer readable storage medium of claim 16, wherein the one or more predefined conditions further include at least one of:
- determining whether an absolute difference between the first battery usage time sample and a last battery usage time sample between the high battery power level and the low battery power level is less than a first predefined value; and
- determining whether a ratio between the first battery usage time sample and the last battery usage time sample between the high battery power level and the low battery power level is within a second predefined range.

20. The non-transitory computer readable storage medium of claim 16, wherein the first battery usage time sample is deemed to be invalid if there is a charge or shutdown of the mobile terminal between the first timestamp and the second timestamp.

21. The non-transitory computer readable storage medium of claim 15, wherein the instruction for determining the remaining battery service time further includes instructions for:
- identifying one or more predefined battery power level intervals from the plurality of predefined battery power level intervals, a respective identified predefined battery power interval including or below the current battery power level;
- accumulating the battery usage times for the predefined battery power level intervals below the current battery power level;

determining a partial battery usage time for the predefined battery power level interval including the current battery power level based on a predefined proportional relationship; and adding the partial battery usage time to the accumulated battery usage times as the remaining battery service time of the mobile terminal.

* * * * *